(12) United States Patent
Stewart

(10) Patent No.: US 11,608,137 B1
(45) Date of Patent: Mar. 21, 2023

(54) HANDLEBAR WRAPS AND HANDLEBAR ASSEMBLIES INCLUDING THE SAME

(71) Applicant: Extreme Steering, Inc., Chino Valley, AZ (US)

(72) Inventor: Gary Stewart, Prescott, AZ (US)

(73) Assignee: Extreme Steering, Inc., Chino Valley, AZ (US)

( * ) Notice: Subject to any disclaimer, the term of this patent is extended or adjusted under 35 U.S.C. 154(b) by 0 days.

(21) Appl. No.: 17/702,084

(22) Filed: Mar. 23, 2022

(51) Int. Cl.
*B62K 21/26* (2006.01)
*B62K 21/12* (2006.01)

(52) U.S. Cl.
CPC .............. *B62K 21/26* (2013.01); *B62K 21/12* (2013.01)

(58) Field of Classification Search
CPC ........ B62K 21/12; B62K 21/26; A63B 53/14; A63B 60/10; A63B 60/14
See application file for complete search history.

(56) References Cited

U.S. PATENT DOCUMENTS

| | | | |
|---|---|---|---|
| 2,207,062 A * | 7/1940 | Lamkin .................. | A63B 53/14 473/302 |
| 2,513,655 A * | 7/1950 | Lamkin .................. | A63B 60/14 69/21 |
| 2,618,986 A * | 11/1952 | Hungerford ......... | A01D 34/824 174/74 A |
| 2,772,090 A * | 11/1956 | Thomas ................. | A63B 53/14 473/301 |
| 3,204,763 A | 9/1965 | Gustafson | |
| 3,848,480 A | 11/1974 | Oseroff et al. | |
| 4,015,851 A | 4/1977 | Pennell | |
| 5,364,677 A | 11/1994 | Sendziak | |
| 5,851,632 A | 12/1998 | Chen et al. | |
| 5,857,929 A * | 1/1999 | Huang ..................... | B32B 3/04 473/549 |
| D412,783 S | 8/1999 | You | |
| 6,261,191 B1 | 7/2001 | Chen | |
| 6,971,959 B1 | 12/2005 | Lu | |
| 6,974,626 B2 | 12/2005 | Horacek | |
| 7,008,687 B2 | 3/2006 | Wang | |
| 8,556,115 B2 * | 10/2013 | Bellerose ........... | B65D 25/2841 220/757 |
| D707,293 S | 6/2014 | Carey | |
| 8,800,112 B1 | 8/2014 | Douglas | |
| D730,146 S | 5/2015 | Stewart | |
| 10,596,943 B2 * | 3/2020 | Strong ..................... | B32B 1/08 |
| 2003/0226421 A1 | 12/2003 | Livingston | |
| 2004/0029645 A1 | 2/2004 | Chen | |
| 2008/0305136 A1 | 12/2008 | Yang et al. | |
| 2010/0126301 A1 | 5/2010 | Yu | |
| 2010/0269626 A1 | 10/2010 | Huang | |
| 2012/0189829 A1 | 7/2012 | Jozuka et al. | |
| 2013/0236703 A1 | 9/2013 | Sommers | |
| 2014/0057091 A1 | 2/2014 | Krawinkel et al. | |
| 2014/0065377 A1 | 3/2014 | Horvath et al. | |
| 2014/0076097 A1 | 3/2014 | Stewart | |

FOREIGN PATENT DOCUMENTS

CA    2428867 A1 * 11/2004 ............. B62K 21/26

* cited by examiner

*Primary Examiner* — Vinh Luong
(74) *Attorney, Agent, or Firm* — Henricks Slavin LLP

(57) ABSTRACT

A handlebar wrap including an elongate main body defining an outer surface, an inner surface, a length, a width that is less than the length and a thickness that extends from the inner surface to the outer surface and is less than the width, and a plurality of damping channels in the main body and closer to the inner surface than the outer surface.

13 Claims, 4 Drawing Sheets

HANDLEBAR WRAPS AND HANDLEBAR ASSEMBLIES INCLUDING THE SAME

BACKGROUND OF THE INVENTIONS

1. Field of the Inventions

The present inventions relate generally to handlebar wraps including, but not limited to, bicycle handlebar wraps, and handlebar assemblies including handlebar wraps.

2. Description of the Related Art

Bicycles typically include, amongst other things, a frame, a fork, front and rear wheels and a handlebar. The front wheel is mounted to the fork, and the fork is connected to the handlebar. Handlebar wraps (including wraps with adhesive layers that are sometimes referred to as "tape") are commonly used to prevent cyclists' hands from slipping and to improve the cyclists' grip on the handlebar. The wraps are typically in the form of long, narrow and thin strips that are spirally wound around a handlebar along the length of the handlebar. In some instances, one wrap is applied to one side of a handle bar and another wrap is applied to the other side. The outer surface, i.e., the surface that is in contact with the hands, may include small grooves, bumps or the like to increase friction and improve grip and provide a path for moisture to be conveyed away from the gripped outer surface.

The present inventor has determined that conventional handlebar wraps are susceptible to improvement. In particular, bicycles such as road bicycles and gravel bicycles employ rigid forks as well as tires that are relatively hard because they are narrow and/or overinflated. Vibrations are transmitted from roads and trails, through the tires, forks and wraps, and into the hands, wrists and arms of cyclists. Continued exposure to these vibrations can lead to Hand Arm Vibration Syndrome (HAVS). Some conventional handlebar wraps are formed from materials with vibration damping properties (e.g., silicone, rubber and foam rubber) in an attempt to address the vibration issue. Multi-layer handlebar wraps that include a grip layer and a padded layer have also been proposed, as has the placement of gel pads under the handlebar wraps. The present inventor has determined that such conventional methods of damping handlebar vibrations provide insufficient vibration damping, increase weight, increase installed wrap diameter, and/or are relatively complicated and expensive to manufacture.

SUMMARY

A handlebar wrap in accordance with one embodiment of a present invention includes an elongate main body defining an outer surface, an inner surface configured to rest on the outer surface of the handlebar, a length, a width that is less than the length and a thickness that extends from the inner surface to the outer surface and is less than the width, and a plurality of damping channels in the main body and closer to the inner surface than the outer surface. A handlebar assembly in accordance with one embodiment of a present invention includes a handlebar in combination with such a handlebar wrap. A method in accordance with one embodiment of a present invention includes wrapping such a handlebar wrap around a handlebar.

There are a number of advantages associated with the present handlebar wraps, assemblies and methods. By way of example, but not limitation, some of the vibration forces that are transmitted through the associated handlebar to the handlebar wrap deform the wrap by compressing the damping channels, thereby reducing the amount of vibration that reaches the cyclist's hands. The presence of the damping channels also reduces the weight of the wrap, as compared to an otherwise identically sized and shaped wrap that was formed from the same material. The present handlebar wrap is also relatively easy and inexpensive to manufacture.

The features of the present inventions will become apparent as the inventions become better understood by reference to the following detailed description when considered in conjunction with the accompanying drawings.

BRIEF DESCRIPTION OF THE DRAWINGS

Detailed description of embodiments of the inventions will be made with reference to the accompanying drawings.

DETAILED DESCRIPTION

The following is a detailed description of the best presently known modes of carrying out the inventions. This description is not to be taken in a limiting sense, but is made merely for the purpose of illustrating the general principles of the inventions.

Figure 1:
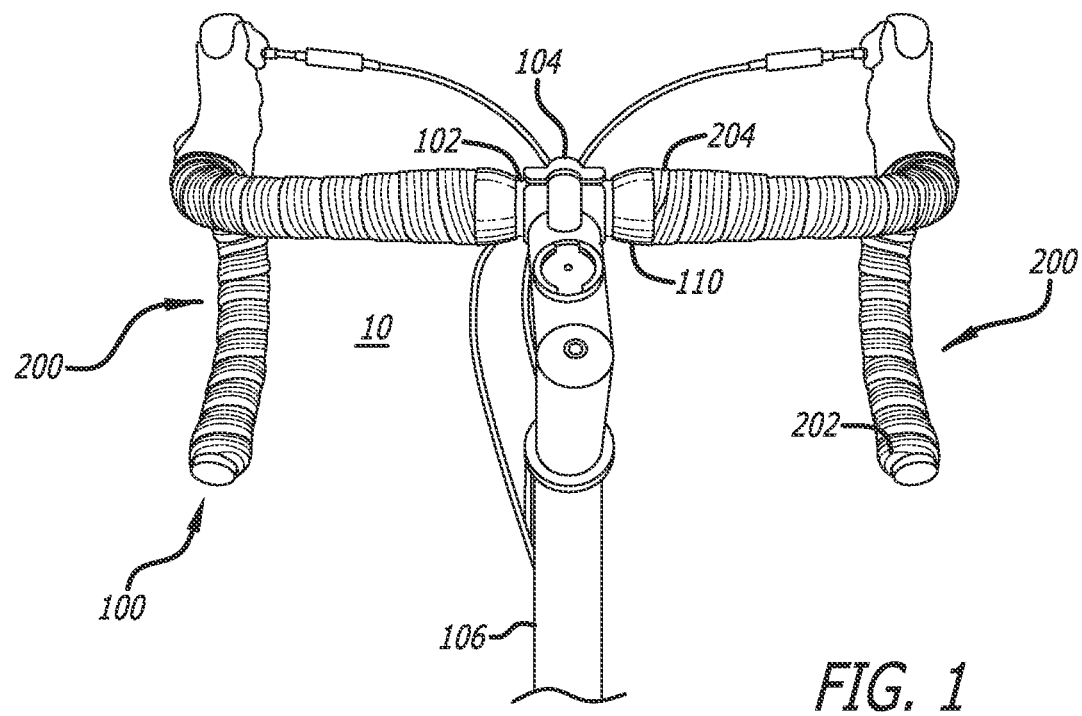
FIG. 1 is a rear view of a handle bar assembly in accordance with one embodiment of a present invention.
Figure 2:
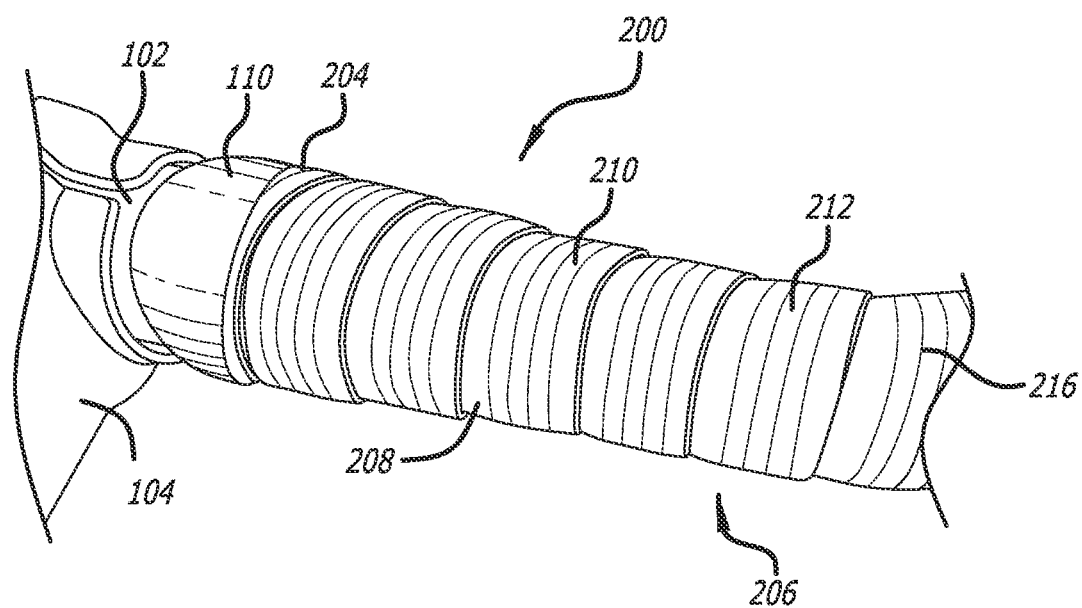
FIG. 2 is a rear view of a portion of the handlebar assembly illustrated in FIG. 1.
Figure 3:
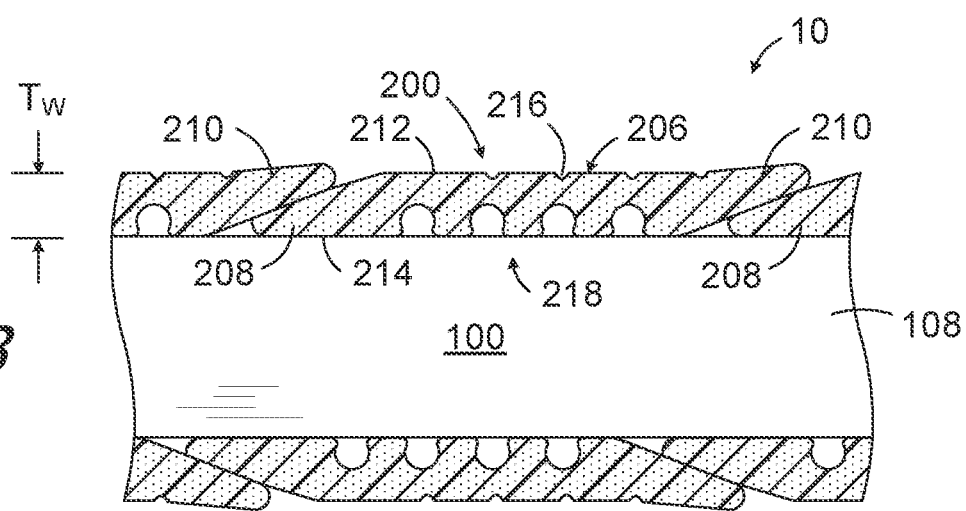
FIG. 3 is a section view of a portion of the handlebar assembly illustrated in FIG. 1.

One example of a handlebar assembly, which is generally represented by reference numeral 10 in FIGS. 1-3, includes a handlebar 100 and a pair of handlebar wraps 200 mounted on the handlebar. The center region 102 of the handlebar 100 may be connected to a stem 104 (or other structure) that passes through the bicycle frame 106 and connects the handlebar to the forks (not shown). The exemplary handlebar 100 is hollow, has an outer surface 108, and may be curved (as shown), straight, or any other configuration, and each handlebar wrap 200 conforms to the underlying handlebar shape. The exemplary handlebar wraps 200 are relatively long, narrow and thin strips that are spirally wrapped around the handlebar 100. Wrap end 202 may be folded over itself to anchor that end to the handlebar 100, while tape 110 may be used to secure wrap end 204 to the handlebar.

Referring more specifically to FIGS. 2 and 3, the exemplary handlebar wrap 200 includes a relatively long main body 206, oppositely oriented beveled portions 208 and 210 on opposite sides (in the width direction) of the main body, an outer surface 212 and an inner surface 214. The inner surface 214 is configured to rest on the outer surface 108 of the handlebar 100 and, in the illustrated embodiment, is flat in cross-section (FIG. 3) but for the damping channels 220 (discussed below). Winding the handlebar wrap 200 tightly around the handlebar with the beveled portion 210 over the beveled portion 208 results in the beveled portion 210 applying a compression force to the beveled portion 208. The compression force creates a frictional engagement between adjacent portions of the wrap 200 and increases the friction force between the beveled portion 208 and the handlebar 100, thereby reducing the likelihood that the handlebar wrap 200 will move during use. The outer surface 212 include a plurality of shallow indentations 216, while the inner surface includes a vibration damper 218. The shallow indentations 216 roughen the outer surface 212, thereby improving the cyclist's grip, and also provide a path for moisture to be wicked or otherwise conveyed away from the gripped outer surface. The vibration damper 218 reduce the magnitude of vibrations transferred through the wrap 200 from the handlebar 100 to the cyclist's hands.

It should be noted here that, as used herein, the "outer surface" is the surface that faces away from the handle bar 100 after the wrap 200 has been wound onto the handlebar and is, and is intended to be, in contact with associated cyclist's hand when in use. Additionally, as used herein, the "inner surface" is the surface that faces the handle bar 100 after the wrap 200 has been wound onto the handlebar and is, and is intended to be, in contact with associated handlebar when in use. It should be further noted that merely turning the wrap 200 upside down would not, for example, transform the outer surface 212 into an inner surface because the shallow indentations 216 are intended to improve the cyclist's grip and convey moisture away from the gripped surface, and are incapable of providing more than de minimis vibration damping and therefore are not "damping channels" as this term is used in the present application. Put another way, there are no damping channels in the solid region 219 between the damping channels 218 and the outer surface 212.

Figure 4:
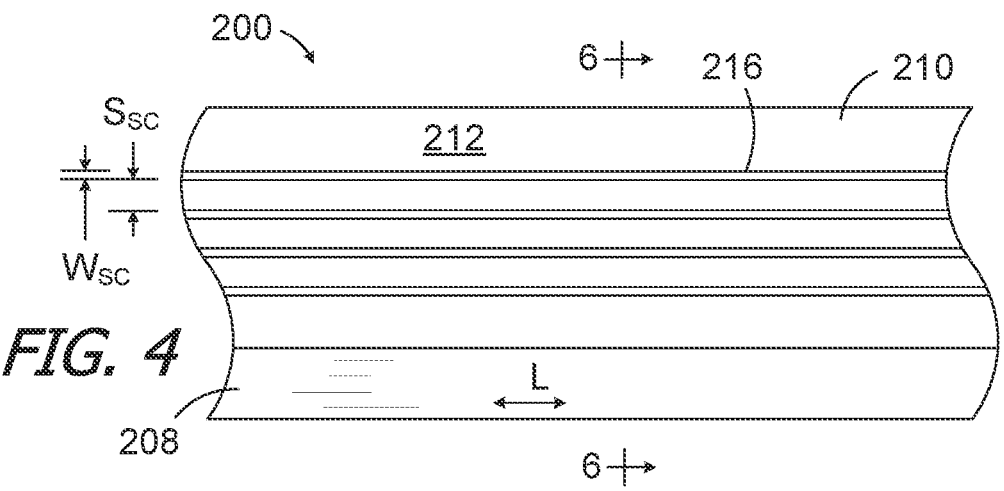
FIG. 4 is a top view of a handlebar wrap in accordance with one embodiment of a present invention.

Referring to FIG. 4, the shallow indentations 216 in the outer surface 212 are semi-circular and extend in the length direction L of the wrap 200 in the exemplary implementation. Although the number may be increased or decreased, there are four shallow indentations 216 of the outer surface 212. The width $W_{SC}$ of the shallow indentations 216 may range from about 0.02 inch to about 0.03 inch, while the depth (FIG. 6) may range from about 0.005 inch to about 0.015 inch. As used herein, the word "about" means ±10%. The width $W_{SC}$ is about 0.02 and the depth is about 0.01 inch in the illustrated embodiment. The spacing $S_{SC}$ between adjacent shallow indentations 216 may range from about 0.10 inch to about 0.14 inch, and is about 0.12 inch in the illustrated embodiment. In other implementations, patterns of geometric shapes may be employed in place of the shallow indentations 216. The shallow indentations 216 may also be omitted so that the outer surface 212 is smooth.

The exemplary wrap 200 may be relatively long and provided in lengths sufficient to allow the wrap to be wound repeatedly around a handlebar, such as handlebar 100, to provide a gripping surface for a cyclist. In some implementations, the length may be at least about 80 inches. The width and thickness of the wrap 200 will be significantly less than the length, and the width will be greater than the thickness. By way of example, the width $W_W$ (FIG. 5) of the wrap 200 may in some instances range from about 0.95 inch to about 1.12 inches, and is about 1.08 inch in the illustrated implementation, while the thickness $T_W$ (FIG. 3) of the wrap may in some instances range from about 0.12 inch to about 0.16 inch, and is about 0.14 inch in the illustrated implementation. The width $W_{MP}$ of the main body 206 may in some instances range from about 0.40 inch to about 0.60 inch, and is about 0.50 inch in the illustrated implementation, while the width WB of each of the beveled portions 208 and 210 may in some instances range from about 0.20 inch to about 0.30 inch, and is about 0.25 inch in the illustrated implementation.

Figure 5:
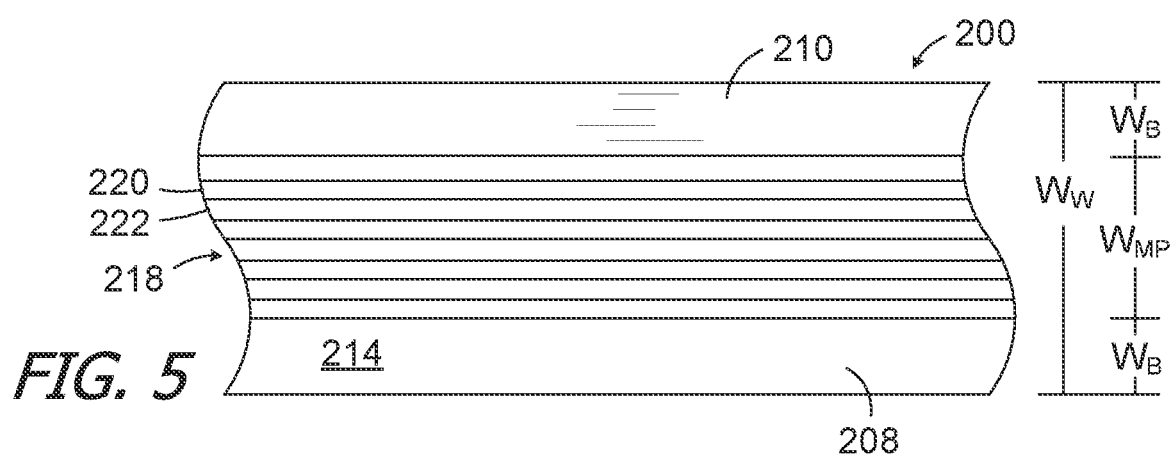
FIG. 5 is a bottom view of the handlebar wrap illustrated in FIG. 4.
Figure 6:
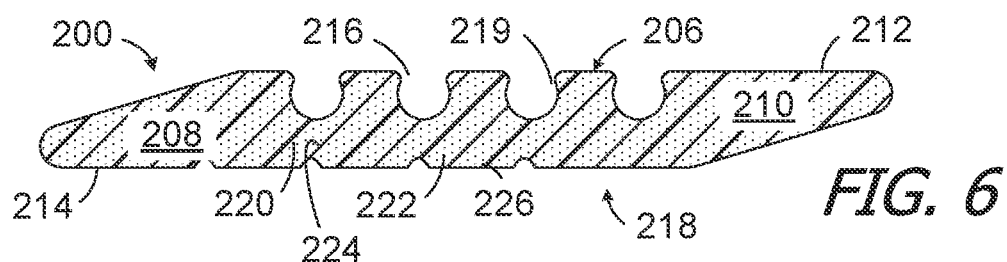
FIG. 6 is a section view taken along line 6-6 in FIG. 4.
Figure 7:
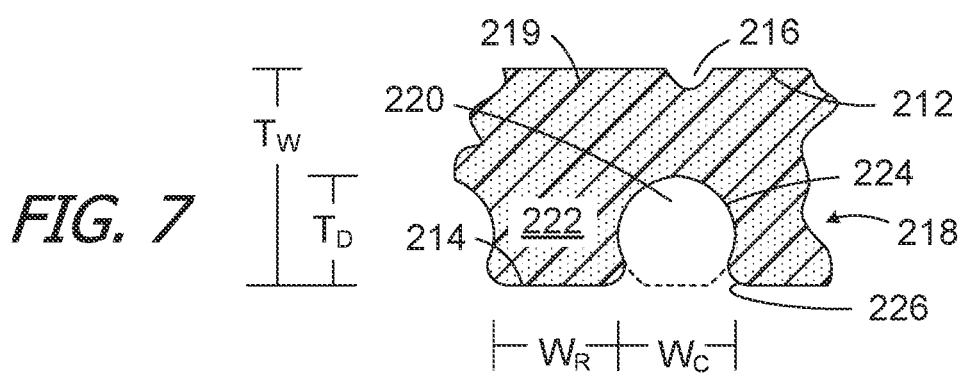
FIG. 7 is an enlarged view of a portion of FIG. 6.

Turning to FIGS. 5-7, the exemplary vibration damper 218 is located within the main body 206 and includes a plurality of damping channels 220 and a plurality of ribs 222. The damping channels 220 and ribs 222 may extend the entire length of the wrap 200. The ribs 222 are located on opposite sides of each of the damping channels 220 and the two outermost ribs (in the width direction) merge with the adjacent beveled portions 208 and 210. The damping channels 220 may have a curved shape in cross-section that is defined by curved walls 224 and, in the illustrated implantation, the shape is generally in the form of a circle that is truncated at the inner surface 214 (note the dashed lines in FIG. 7) such that the open end of the cross-sectional shape abuts the handlebar outer surface 108. The curved walls 224 also define the lateral sides of the ribs 224. The sizes and shapes of the damping channels may be identical (as shown) or different. In some instances, a damping channel may be added to the beveled portion 208, which is configured to rest against the handlebar outer surface 108. Conversely, the beveled portion 210, which rests on the beveled portion 208 instead of the handlebar outer surface 108, would typically not include a damping channel. The rounded corners 226 of the damping channels 220 in the illustrated embodiment slightly enlarge the width of the damping channels at the inner surface 214. Sharp corners may be provided in other implementations.

Suitable materials for exemplary handlebar wrap 200 include, but are not limited to, materials with vibration damping properties such as silicone sponge, rubber foam sponge, and silicone. The exemplary handlebar wrap 200 may be formed by an extrusion process.

Referring again to FIG. 7, and although the present inventions are not so limited, the thickness $T_D$ of the vibration damper 218 may be about 35% to about 60% of the thickness $T_W$ of the wrap 200, and is about 50% in the illustrated implementation. The open cross-sectional area defined by the damping channels 220 may in some instances range from about 40% to about 50% of the cross-sectional area of the vibration damper 218 and is about 45% in the illustrated implementation. Similarly, the open cross-sectional area defined by the damping channels 220 may in some instances range from about 24% to about 34% of the cross-sectional area of the main body 206 and is about 29% in the illustrated implementation.

Figure 8:
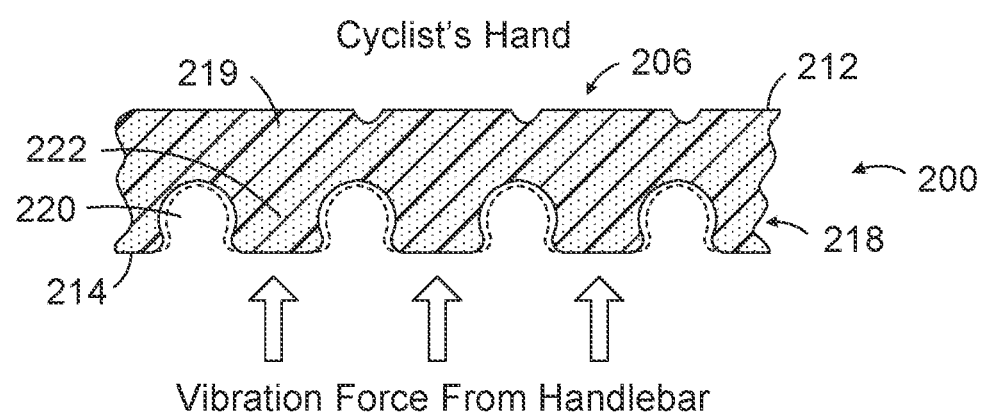
FIG. 8 is a section view similar to FIG. 6.

There are a variety of advantages associated with the configuration of the exemplary handlebar wrap 200. Referring to FIG. 8, some of the vibration forces that are transmitted through the associated handlebar (e.g., handlebar 100) to the handlebar wrap 200 deform the wrap by compressing the damping channels 220 in the manner shown in dashed lines. The amount of vibration damping achieved is greater than that which would be achieved by an otherwise identical handlebar wrap, formed from the same material as the wrap 200, that did not include the damping channels 220. The presence of the damping channels 220 also reduces the weight of the wrap 200, as compared to an otherwise identically sized and shaped wrap that was formed from the same material. The present handlebar wrap is also relatively easy and inexpensive to manufacture.

The present inventor has determined that the illustrated implementation provides significant vibration damping while at the same time maintaining an acceptable level of structural integrity of the wrap. For example, the curved shape of the damping channels 220 facilitates efficient vibration-damping distortion of the damping channels 220. Nevertheless, in other instances, cyclists may desire less structural integrity and more vibration damping, or more structural integrity and less damping, or a thicker wrap, or a thinner wrap. For example, some or all of the walls that define the damping channels may be oval or other non-circular curved shape and/or some or all of the walls that define the damping channels may be planar. Alternatively, or in addition, the number and/or sizes of the damping channels may be increased of decreased. The damping channels may also be located entirely within the main body 206, thereby eliminating the open ends of the damping channels.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

I claim:

1. A handlebar wrap for use with a handlebar defining an outer surface, the handlebar wrap comprising:
    an elongate main body defining an outer surface, an inner surface configured to rest on the outer surface of the handlebar, a length, a width that is less than the length and a thickness that extends from the inner surface to the outer surface and is less than the width and formed from a material selected from the group consisting of silicone sponge, rubber foam sponge, and silicone;
    a plurality of damping channels in the main body that are parallel to the length of the main body and are curved in a cross-section perpendicular to the length of the main body, and that extend from the inner surface to a location between the inner surface and the outer surface and define openings in the inner surface; and
    a plurality of ribs, respectively located between adjacent damping channels, that are parallel to the length of the main body and that extend to the inner surface and include curved lateral sides in a cross-section perpendicular to the length of the main body with curvatures that correspond to the curved damping channels;
    wherein the inner surface of the main body is flat in a cross-section perpendicular to the length of the main body but for the damping channels.

2. A handlebar wrap as claimed in claim 1, wherein the damping channels define a truncated circle in a cross-section perpendicular to the length of the main body.

3. A handlebar wrap as claimed in claim 1, wherein the main body includes a region with no damping channels between the location and the outer surface.

4. A handlebar wrap as claimed in claim 1, wherein the location is about half-way between the inner surface and the outer surface.

5. A handlebar wrap as claimed in claim 1, further comprising:
    a plurality of shallow indentations on outer surface.

6. A handlebar wrap as claimed in claim 1, further comprising:
    first and second oppositely oriented beveled portions on opposite sides of the main portion.

7. A handlebar wrap as claimed in claim 1, wherein
    the main body defines a cross-sectional area in a cross-section perpendicular to the length of the main body; and
    the damping channels together define a cross-sectional area in a cross-section perpendicular to the length of the main body that is about 24% to about 34% of the cross-sectional area of the main body.

8. A handlebar assembly, comprising:
    handlebar; and
    at least one handlebar wrap as claimed in claim 1 wound around the handlebar.

9. A handlebar assembly as claimed in claim 8, wherein the at least one handlebar wrap comprises first and second handlebar wraps.

10. A handlebar assembly as claimed in claim 8, wherein the handlebar defines an outer surface; and
    the plurality of damping channels abut the outer surface of the handlebar.

11. A method, comprising the step of:
    wrapping at least one handlebar wrap as claimed in claim 1 around a handlebar.

12. A method as claimed in claim 11, wherein
    the at least one handlebar wrap comprises first and second handlebar wraps.

13. A method as claimed in claim 11, wherein
    the handlebar defines an outer surface; and
    wrapping at least one handlebar wrap comprises wrapping the at least one handlebar wrap around the handlebar such that the damping channels abut the outer surface of the handlebar.

* * * * *